(12) United States Patent
Sullivan et al.

(10) Patent No.: US 6,375,270 B1
(45) Date of Patent: Apr. 23, 2002

(54) SEAT BELT RESTRAINT SYSTEM

(75) Inventors: John L. Sullivan, Ann Arbor; Kirsten Marie Carr, Ypsilanti, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,689

(22) Filed: Jan. 13, 2000

(51) Int. Cl.$^7$ ................................................ B60R 21/00
(52) U.S. Cl. ....................................................... 297/484
(58) Field of Search ................................ 297/474, 483, 297/484, 468, 464; 280/808, 801.1

(56) References Cited

U.S. PATENT DOCUMENTS

| 3,162,485 A | 12/1964 | Prangnell et al. | ............ 297/389 |
| 3,380,776 A | * 4/1968 | Dillender | |
| 4,236,755 A | 12/1980 | Pollitt et al. | ................. 297/483 |
| 5,123,673 A | 6/1992 | Tame | ........................... 280/801 |
| 5,265,910 A | 11/1993 | Barr et al. | .................... 280/808 |
| 6,076,894 A | * 6/2000 | Busch | |

FOREIGN PATENT DOCUMENTS

| AU | 3781595 | | 5/1997 | ..................... 22/12 |
| GB | 1184182 | * | 3/1970 | |
| JP | 94053 | * | 4/1989 | |
| JP | 277345 | | 3/1990 | ..................... 22/12 |
| JP | 5139245 | | 6/1993 | ....................... 22/2 |
| JP | 6255445 | | 9/1994 | ..................... 22/26 |
| JP | 7291092 | | 11/1995 | ..................... 22/12 |

* cited by examiner

Primary Examiner—Milton Nelson, Jr.
(74) Attorney, Agent, or Firm—David B. Kelley

(57) ABSTRACT

A seat belt restraint system is provided for a vehicle seat having a seat back extending between a top and bottom portion and a seat cushion extending between an inboard and outboard side. The seat belt restraint system includes a clasp interconnecting an inboard shoulder belt webbing with an inboard lap belt webbing adjacent the inboard side of the seat cushion. The seat belt restraint system further includes a buckle interconnecting an outboard shoulder belt webbing with an outboard lap belt webbing adjacent the outboard side of the seat cushion. The seat belt restraint system includes a buckle anchor mounted to the inboard side of the seat cushion for lockably receiving the buckle. The buckle includes an outboard connect mechanism for releasably locking the clasp to the buckle and define a four point seat belt configuration with the buckle and clasp positioned midway between the inboard and outboard side of the seat cushion. The buckle also includes an inboard connect mechanism for releasably locking the buckle to the buckle anchor and define a three point seat belt configuration with the clasp latched to the buckle and the buckle latched to the buckle anchor adjacent the inboard side of the seat cushion.

9 Claims, 2 Drawing Sheets

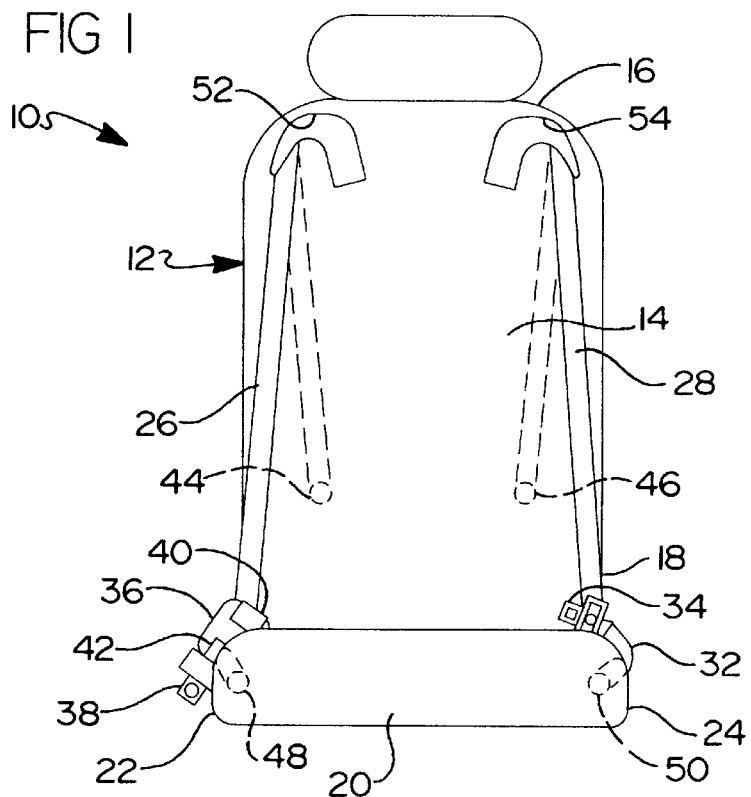

SEAT BELT RESTRAINT SYSTEM

BACKGROUND OF THE INVENTION

1. Field of the Invention

The present invention relates generally to a seat belt restraint system and, more specifically, to a seat belt restraint system which may be configured for use as a four point or three point seat belt restraint system.

2. Description of the Related Art

Automotive vehicle seats include a generally upright seat back mounted to a generally horizontal seat cushion for supporting a seated occupant. The seat back includes a top portion which often supports a headrest and a bottom portion which is often pivotally attached to the seat cushion for providing reclining adjustment of the seat back. The seat cushion extends between an inboard side (adjacent the center of the vehicle) and an outboard side (adjacent the outside of the vehicle). A seat belt restraint system is commonly secured to the seat or the vehicle structure surrounding the seat for restraining the seated occupant in the seat. The seat belt restraint system typically forms either a three point seat belt configuration or a four point seat belt configuration. The three point seat belt configuration is generally defined by including a lap belt webbing extending between the inboard and outboard side of the seat cushion and a shoulder belt webbing extending diagonally from the outboard, top portion of the seat back to the inboard, bottom portion of the seat back. The lap belt webbing and shoulder belt webbing are generally interconnected by a clasp, or latch plate, and the clasp is releasably latched to a buckle on the inboard side of the seat cushion. The four point seat belt configuration is generally defined by an inboard and outboard shoulder belt webbing extending from the top portion to the bottom portion of the seat back adjacent the respective inboard and outboard side of the seat to a corresponding inboard and outboard lap belt webbing extending from the respective inboard and outboard sides of the seat cushion. The clasp, or latch plate, interconnects with the buckle to interconnect the shoulder belt webbing with the lap belt webbing to complete the four point seat belt configuration.

It is also known to provide a seat belt restraint system for use with a vehicle seat which includes a three point seat belt configuration formed by a lap belt webbing and a shoulder belt webbing and further includes a four point seat belt configuration formed by a second shoulder belt webbing. U.S. Pat. No. 5,123,673 to Tame, issued Jun. 23, 1992, is an example of a seat belt restraint system including both a three point and four point seat belt configuration. However, these type of seat belt restraint systems typically require the use of multiple latch plates and buckles to interconnect each of the shoulder belt webbing and lap belt webbing in each of the three point and four point seat belt configurations.

It remains desirable to provide a seat belt restraint system which is comfortable, easy to use, and includes a single buckle and clasp for providing operation between either a three point seat belt restraint configuration or a four point seat belt restraint configuration.

SUMMARY OF THE INVENTION

Accordingly, the present invention is a seat belt restraint system for a vehicle seat having a seat back extending between a top and bottom portion and a seat cushion extending between an inboard and outboard side. The seat belt restraint system includes a first shoulder belt webbing extending from the top portion to the bottom portion of the seat back adjacent the inboard side of the seat cushion and a second shoulder belt webbing extending from the top portion to the bottom portion of the seat back adjacent the outboard side of the seat cushion. The seat belt restraint system further includes a first lap belt webbing extending from the inboard side of the seat cushion to the first shoulder belt webbing adjacent the bottom portion of the seat back and a second lap belt webbing extending from the outboard side of the seat cushion to the second shoulder belt webbing adjacent the bottom portion of the seat back. The seat belt restraint system includes a clasp interconnecting one of the first and second shoulder belt webbing to the respective one of the first and second lap belt webbing and a buckle interconnecting the other of the first and second shoulder belt webbing to the respective one of the first and second lap belt webbing for lockably receiving the clasp. The seat belt restraint system also includes a buckle anchor fixedly secured adjacent one of the inboard and outboard sides of the seat cushion for lockably receiving the buckle. Finally, the seat belt restraint system includes a first connect mechanism secured to the buckle for releasably locking the clasp to the buckle to define a four point seat belt restraint configuration with the buckle and clasp positioned generally midway between the inboard and outboard side of he seat cushion and a second connect mechanism secured to the buckle for releasably locking the buckle to the buckle anchor to define a three point seat belt restraint configuration with the clasp releasably locked to the buckle and the buckle releasably locked to the buckle anchor adjacent one of the inboard and outboard sides of the seat cushion.

The seat belt restraint system is easy to use because it includes a single buckle and clasp for connection between either the three point seat belt restraint configuration or the four point seat belt restraint configuration. Further, the buckle includes both the first connect mechanism for releasably locking the clasp to the buckle in the four point seat belt restraint configuration and the second connect mechanism for automatically releasably locking the buckle to the buckle anchor in the three point seat belt restraint configuration when the first outboard shoulder belt webbing is extended diagonally across the seat back and the clasp is releasably locked to the buckle by the first connect mechanism. Still further, the seat belt restraint system is more comfortable by including a pair of D-rings in the seat back which receive and guide the first and second shoulder belt webbing between the three point seat belt restraint configuration and the four point seat belt restraint configuration.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a front view of a seat belt restraint system in a non-use position, according to the present invention.

FIG. 2 is a front view of the seat belt restraint system shown in a three point seat belt restraint configuration.

DESCRIPTION OF THE PREFERRED EMBODIMENT(S)

Figure 3:
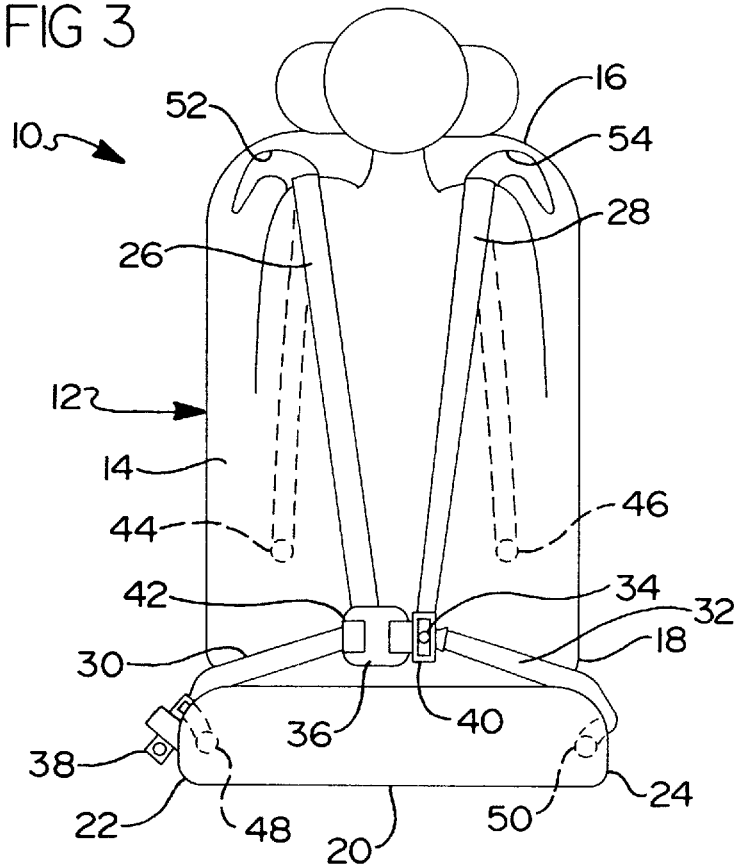
FIG. 3 is a front view of the seat belt restraint system shown in a four point seat belt restraint configuration.

Referring to the drawings and in particular FIGS. 1 and 3, one embodiment of a seat belt restraint system 10, according to the present invention, is shown. A seat 12, typically for use in an automotive vehicle (not shown), includes a generally upright seat back 14 extending between a top portion 16 and a bottom portion 18 for supporting the back of a seated occupant. The seat 12 further includes a generally horizontal seat cushion 20 projecting forwardly from the bottom portion 18 of the seat back 14 and extending between an inboard side 22 and an outboard side 24 for supporting the bottom of the seated occupant. The inboard side 22 is further defined by the side of the seat 12 adjacent the inboard or middle of the vehicle and the outboard side 24 is further defined by the side of the seat 12 adjacent the outboard or outside of the vehicle as is commonly known in the art.

The seat belt restraint system 10 includes a first, or inboard, shoulder belt webbing 26 extending from the top portion 16 to the bottom portion 18 of the seat back 14 adjacent the inboard side 22 of the seat cushion 20. The seat belt restraint system 10 includes a second, or outboard, shoulder belt webbing 28 extending from the top portion 16 to the bottom portion 18 of the seat back 14 adjacent the outboard side 24 of the seat cushion 20. The seat belt restraint system 10 further includes a first, or inboard, lap belt webbing 30 extending from the inboard side 22 of the seat cushion 20 to the inboard shoulder belt webbing 26 adjacent the bottom portion 18 of the seat back 14 and a second, or outboard, lap belt webbing 32 extending from the outboard side 24 of the seat cushion 20 to the outboard shoulder belt webbing 28 adjacent the bottom portion 18 of the seat back 14.

The seat belt restraint system 10 also includes a clasp 34 interconnecting the outboard shoulder belt webbing 28 and the outboard lap belt webbing 32 adjacent the bottom portion 18 of the seat back 14. Similarly, the seat belt restraint system 10 includes a buckle 36 interconnecting the inboard shoulder belt webbing 26 and the inboard lap belt webbing 30 adjacent the bottom portion 18 of the seat back 14 for lockably receiving the clasp 34 as will be described in further detail herein below.

A buckle anchor 38 is fixedly secured by bolts, fasteners, welds, or the like, to the inboard side 22 of the seat cushion 20 for lockably receiving the buckle 36. It should be appreciated that the buckle anchor 38 may also be fixedly secured to the floor or other structure of vehicle (not shown) as long as the structure is capable of supporting seat belt loads as is commonly known in the art.

The seat belt restraint system 10 further includes a first, or outboard, connect mechanism 40 secured to the buckle 36 for releasably locking the clasp 34 to the buckle 36 to define a four point seat belt restraint configuration with the buckle 36 and clasp 34 positioned generally midway between the inboard side 22 and outboard side 24 of the seat cushion 20, as shown in FIG. 3. The seat belt restraint system 10 includes a second, or inboard, connect mechanism 42 secured to the buckle 36 for releasably locking the buckle 36 to the buckle anchor 38 to define a three point seat belt restraint configuration with the clasp 34 releasably locked to the buckle 36 and the buckle 36 releasably locked to the buckle anchor 38 adjacent the inboard side 22 of the seat cushion 20, as shown in FIG. 2. The outboard and inboard connect mechanisms 40 and 42 are integrally secured to opposing sides of the buckle 36 and include a push button type connect and release mechanism (not shown) as is commonly known in the art.

Figure 4:
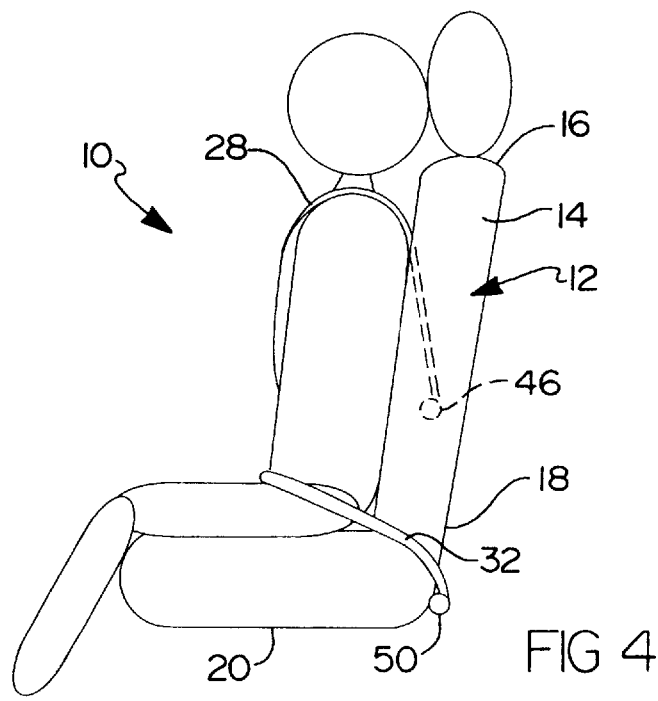
FIG. 4 is a side view of the seat belt restraint system shown in the four point seat belt restraint configuration.

Referring to FIGS. 1 and 4, the seat belt restraint system 10 also includes an inboard shoulder belt retractor 44 and an outboard shoulder belt retractor 46 which are shown in the preferred embodiment as being mounted in the seat back 14 between the top portion 16 and the bottom portion 18. More specifically, the inboard shoulder belt retractor 44 is mounted in the seat back 14 adjacent the inboard side 22 of the seat cushion 20 and the outboard shoulder belt retractor 46 is mounted in the seat back 14 adjacent the outboard side 24 of the seat cushion 20. A portion of the inboard shoulder belt webbing 26 is wound in the inboard shoulder belt retractor 44. Similarly, a portion of the outboard shoulder belt webbing 28 is wound in the outboard shoulder belt retractor 46. The inboard and outboard shoulder belt retractors 44, 46 provide adjustment of the length of the respective inboard and outboard shoulder belt webbing 26 and 28 for varying sized seated occupants and for positioning of the seat belt restraint system 10 between the three point seat belt restraint configuration and the four point seat belt restraint configuration.

The seat belt restraint system 10 further includes an inboard lap belt retractor 48 mounted to the inboard side 22 of the seat cushion 20 adjacent the bottom portion 18 of the seat back 14 and an outboard lap belt retractor 50 mounted to the outboard side 24 of the seat cushion 20 adjacent the bottom portion 18 of the seat back 14. A portion of the inboard lap belt webbing 30 is wound in the inboard lap belt retractor 48 and a portion of the outboard lap belt webbing 32 is wound in the outboard lap belt retractor 50. The inboard and outboard lap belt retractors 48 and 50 similarly provide adjustment to the length of the respective inboard and outboard lap belt webbing 30 and 32 for varying sized seated occupants and for positioning of the seat belt restraint system 10 between the three point seat belt restraint configuration and the four point seat belt restraint configuration. It should be appreciated that the inboard and outboard shoulder belt retractors 44 and 46 as well as the inboard and outboard lap belt retractors 48 and 50 may be securely attached to the seat 12, as shown, or to other structures of the vehicle (not shown) which adequately support seat belt loads, as is commonly known in the art.

Finally, the seat belt restraint system 10 includes a first shoulder belt webbing, or inboard, D-ring 52 secured to the top portion 16 of the seat back 14 adjacent the inboard side 22 of the seat cushion 20 for receiving and guiding the inboard shoulder belt webbing 26 between the four point seat belt restraint configuration and the three point seat belt restraint configuration. The seat belt restraint system 10 also includes a second shoulder belt webbing, or outboard, D-ring 54 secured to the top portion 16 of the seat back 14 adjacent the outboard side 24 of the seat cushion 20 for receiving and guiding the outboard shoulder belt webbing 28 between the four point seat belt restraint configuration and the three point seat belt restraint configuration.

More specifically, the inboard D-ring 52 forms an arcuate slot through a portion of the seat back 14 for receiving and guiding the inboard shoulder belt webbing 26 from the inboard shoulder belt retractor 44 to the buckle 36 and providing lateral movement of the inboard shoulder belt webbing 26 during attachment of the seat belt restraint system 10 in each of the three point and four point seat belt restraint configurations. The outboard D-ring 54 forms an arcuate slot through a portion of the seat back 14 for receiving and guiding the outboard shoulder belt webbing 28 from the outboard shoulder belt retractor 46 to the clasp 34 and providing lateral movement of the outboard shoulder belt webbing 28 during attachment of the seat belt restraint system 10 in each of the three point and four point seat belt restraint configurations.

In operation, referring to FIG. 1, the seat belt restraint system 10 is shown in a non-use position or configuration.

In the non-use position, the outboard shoulder belt retractor 46 and the outboard lap belt retractor 50 automatically retract, or wind, the respective outboard shoulder belt webbing 28 and outboard lap belt webbing 32 to bias and position the clasp 34 adjacent the bottom portion 18 of the seat back 14 and the outboard side 24 of the seat cushion 20. The inboard shoulder belt retractor 44 and the inboard lap belt retractor 48 automatically retract, or wind, the respective inboard shoulder belt webbing 26 and inboard lap belt webbing 30 to bias and position the buckle 36 adjacent the bottom portion 18 of the seat back 14 and the inboard side 22 of the seat cushion 20. In the non-use position, the buckle 36 and inboard connect mechanism 42 are resting on but not latched, or releasably locked, to the buckle anchor 38. Therefore, when an occupant enters the seat 12, he or she may easily reach either just the clasp 34 for manipulation and connection of the seat belt restraint system 10 in the three point seat belt restraint configuration or both the clasp 34 and buckle 36 for manipulation and connection of the seat belt restraint system 10 in the four point seat belt restraint configuration.

Referring now to FIG. 2, the seat belt restraint system 10 is shown in the three point seat belt restraint configuration. In order to connect the seat belt restraint system 10 in the three point seat belt configuration, the seated occupant pulls the clasp 34 across his or her body from the outboard side 24 towards the inboard side 22 of the seat cushion 20. The pulling of the clasp 34 automatically pulls and unwinds the outboard shoulder belt webbing 28 from the outboard shoulder belt retractor 46 and the outboard lap belt webbing 32 from the outboard lap belt retractor 50. The seated occupant then inserts the clasp 34 into the buckle 36 and the outboard connect mechanism 40 releasably locks the clasp 34 to the buckle 36. Simultaneously, the buckle 36 is automatically latched to the buckle anchor 38 and the inboard connect mechanism 42 releasably locks the buckle 36 to the buckle anchor 3 8 forming the three point seat belt restraint configuration as shown in FIG. 2. When the seated occupant releases the outboard connect mechanism 40, the clasp 34 is unlocked and released from the buckle 36 and the inboard connect mechanism 42 is automatically released to unlock and release the buckle 36 from the buckle anchor 38. The outboard shoulder belt retractor 46 and the outboard lap belt retractor 50 then automatically wind the respective outboard shoulder belt webbing 28 and outboard lap belt webbing 32 to return the clasp 34 and seat belt restraint system 10 to the original non-use position.

Referring to FIG. 3, the seat belt restraint system 10 is shown in the four point seat belt restraint configuration. In order to connect the seat belt restraint system 10 in the four point seat belt configuration, the seated occupant simultaneously pulls the clasp 34 and buckle 36 together near a position generally midway between the inboard side 22 and outboard side 24 of the seat cushion 20 in front of the seated occupant. The inboard and outboard shoulder belt webbing 26 and 28 unwind from the respective inboard and outboard shoulder belt retractors 44 and 46 while the inboard and outboard lap belt webbing 30 and 32 simultaneously unwind from the respective inboard and outboard lap belt retractors 48 and 50. Additionally, arcuate slots formed by the inboard and outboard D-rings 52 and 54 allow the respective inboard and outboard shoulder belt webbing 26 and 28 to move inwardly and downwardly, as shown in FIGS. 1 and 3, to positively position and engage the seated occupant's shoulders. Finally, the seated occupant inserts the clasp 34 into the buckle 36 and the outboard connect mechanism 40 releasably locks the clasp 34 to the buckle 36 in the four point seat belt restraint configuration. Again, when the seated occupant releases the outboard connect mechanism 40, the clasp 34 is unlocked and released from the buckle 36. The retractors 44 through 50 then automatically retract and rewind the respective seat belt webbing 26 through 32 and return the seat belt restraint system 10 to its original non-use position as shown in FIG. 1.

The seat belt restraint system 10 provides a comfortable, easy to use, seat belt restraint system 10 operable between either a three point seat belt restraint configuration or a four point seat belt restraint configuration which will restrain the occupant in the seat 12 and maintain proper positioning during an impact event and seat belt load.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat belt restraint system for a vehicle seat having a seat back extending between a top and bottom portion and a seat cushion extending between an inboard and outboard side, said seat belt restraint system comprising:

a first shoulder belt webbing adapted to extend from the top portion to the bottom portion of the seat back adjacent the inboard side of the seat cushion;

a second shoulder belt webbing adapted to extend from the top portion to the bottom portion of the seat back adjacent the outboard side of the seat cushion;

a first lap belt webbing adapted to extend from the inboard side of the seat cushion to said first shoulder belt webbing adjacent the bottom portion of the seat back;

a second lap belt webbing adapted to extend from the outboard side of the seat cushion to said second shoulder belt webbing adjacent the bottom portion of the seat back;

a clasp interconnecting one of said first and second shoulder belt webbing to a respective one of said first and second lap belt webbing;

a buckle interconnecting the other of said first and second shoulder belt webbing to a respective one of a first and second lap belt webbing for lockably receiving said clasp;

a buckle anchor adapted to be fixedly secured adjacent one of the inboard and outboard side of the seat cushion for lockably receiving said buckle;

a first connect mechanism secured to said buckle for releasably locking said clasp to said buckle to define a four point seat belt restraint configuration with said buckle and clasp positioned generally midway between the inboard and outboard side of the seat cushion; and a second connect mechanism secured to said buckle for releasably locking said buckle to said buckle anchor to define a three point seat belt restraint configuration with said clasp releasably locked to said buckle and said buckle releasably locked to said buckle anchor adjacent one of the inboard and outboard side of the seat cushion.

2. A seat belt restraint system for a vehicle seat having a seat back extending between a top and bottom portion and a seat cushion extending between an inboard and outboard side, said seat belt restraint system comprising:

a first shoulder belt webbing adapted to extend from the top portion to the bottom portion of the seat back adjacent the inboard side of the seat cushion;

a second shoulder belt webbing adapted to extend from the top portion to the bottom portion of the seat back adjacent the outboard side of the seat cushion;

a first lap belt webbing adapted to extend from the inboard side of the seat cushion to said first shoulder belt webbing adjacent the bottom portion of the seat back;

a second lap belt webbing adapted to extend from the outboard side of the seat cushion to said second shoulder belt webbing adjacent the bottom portion of the seat back;

a clasp interconnecting one of said first and second shoulder belt webbing to a respective one of said first and second lap belt webbing;

a buckle interconnecting the other of said first and second shoulder belt webbing to a respective one of said first and second lap belt webbing for lockably receiving said clasp;

a buckle anchor adapted to be fixedly secured adjacent one of the inboard and outboard side of the seat cushion for lockably receiving said buckle;

a first connect mechanism secured to said buckle for releasably locking said clasp to said buckle to define a four point seat belt restraint configuration with said buckle and clasp positioned generally midway between the inboard and outboard side of the seat cushion;

a second connect mechanism secured to said buckle for releasably locking said buckle to said buckle anchor to define a three point seat belt restraint configuration with said clasp releasably locked to said buckle and said buckle releasably locked to said buckle anchor adjacent one of the inboard and outboard side of the seat cushion; and a first shoulder belt webbing D-ring adapted to be secured to the top portion of the seat back adjacent the inboard side of the seat cushion for receiving and guiding said first shoulder belt webbing between said four point seat belt restraint configuration and said three point seat belt restraint configuration.

3. A seat belt restraint system as set forth in claim 2 including a second shoulder belt webbing D-ring adapted to be secured to the top portion of the seat back adjacent the outboard side of the seat cushion for receiving and guiding said second shoulder belt webbing between said four point seat belt configuration and said three point seat belt configuration.

4. A seat belt restraint system for a vehicle seat having a seat back extending between a top and bottom portion and a seat cushion extending between an inboard and outboard side, said seat belt restraint system comprising:

a first shoulder belt webbing adapted to extend from the top portion to the bottom portion of the seat back adjacent the inboard side of the seat cushion;

a second shoulder belt webbing adapted to extend from the top portion to the bottom portion of the seat back adjacent the outboard side of the seat cushion;

a first lap belt webbing adapted to extend from the inboard side of the seat cushion to said first shoulder belt webbing adjacent the bottom portion of the seat back;

a second lap belt webbing adapted to extend from the outboard side of the seat cushion to said second shoulder belt webbing adjacent the bottom portion of the seat back;

a clasp interconnecting one of said first and second shoulder belt webbing to a respective one of said first and second lap belt webbing;

a buckle interconnecting the other of said first and second shoulder belt webbing to a respective one of said first and second lap belt webbing for lockably receiving said clasp;

a buckle anchor adapted to be fixedly secured adjacent one of the inboard and outboard side of the seat cushion for lockably receiving said buckle;

a first connect mechanism secured to said buckle for releasably locking said clasp to said buckle to define a four point seat belt restraint configuration with said buckle and clasp positioned generally midway between the inboard and outboard side of the seat cushion;

a second connect mechanism secured to said buckle for releasably locking said buckle to said buckle anchor to define a three point seat belt restraint configuration with said clasp releasably locked to said buckle and said buckle releasably locked to said buckle anchor adjacent one of the inboard and outboard side of the seat cushion; and an inboard shoulder belt retractor adapted to be mounted to the seat back for automatically winding at least a portion of said first shoulder belt webbing.

5. A seat belt restraint system as set forth in claim 4 including an outboard shoulder belt retractor adapted to be mounted to the seat back for automatically winding at least a portion of said second shoulder belt webbing.

6. A seat belt restraint system for a vehicle seat having a seat back extending between a top and bottom portion and a seat cushion extending between an inboard and outboard side, said seat belt restraint system comprising:

a first shoulder belt webbing adapted to extend from the top portion to the bottom portion of the seat back adjacent the inboard side of the seat cushion;

a second shoulder belt webbing adapted to extend from the top portion to the bottom portion of the seat back adjacent the outboard side of the seat cushion;

a first lap belt webbing adapted to extend from the inboard side of the seat cushion to said first shoulder belt webbing adjacent the bottom portion of the seat back;

a second lap belt webbing adapted to extend from the outboard side of the seat cushion to said second shoulder belt webbing adjacent the bottom portion of the seat back;

a clasp interconnecting one of said first and second shoulder belt webbing to a respective one of said first and second lap belt webbing;

a buckle interconnecting the other of said first and second shoulder belt webbing to a respective one of said first and second lap belt webbing for lockably receiving said clasp;

a buckle anchor adapted to be fixedly secured adjacent one of the inboard and outboard side of the seat cushion for lockably receiving said buckle;

a first connect mechanism secured to said buckle for releasably locking said clasp to said buckle to define a four point seat belt restraint configuration with said buckle and clasp positioned generally midway between the inboard and outboard side of the seat cushion;

a second connect mechanism secured to said buckle for releasably locking said buckle to said buckle anchor to define a three point seat belt restraint configuration with said clasp releasably locked to said buckle and said buckle releasably locked to said buckle anchor adjacent one of the inboard and outboard side of the seat cushion; and an inboard lap belt retractor adapted to be mounted to the inboard side of the seat cushion for automatically winding at least a portion of said first lap belt webbing.

7. A seat belt restraint system as set forth in claim 6 including an outboard lap belt retractor adapted to be mounted to the outboard side of the seat cushion for automatically winding at least a portion of said second lap belt webbing.

8. A seat belt restraint system for a vehicle seat having a seat back extending between a top and bottom portion and a seat cushion extending between an inboard and outboard side, said seat belt restraint system comprising:

an inboard shoulder belt webbing adapted to extend from the top portion to the bottom portion of the seat back adjacent the inboard side of the seat cushion;

an outboard shoulder belt webbing adapted to extend from the top portion to the bottom portion of the seat back adjacent the outboard side of the seat cushion;

an inboard lap belt webbing adapted to extend from the inboard side of the seat cushion to said inboard shoulder belt webbing adjacent the bottom portion of the seat back;

an outboard lap belt webbing adapted to extend from the outboard side of the seat cushion to said outboard shoulder belt webbing adjacent the bottom portion of the seat back;

a clasp interconnecting said outboard shoulder belt webbing and said outboard lap belt webbing;

a buckle anchor adapted to be fixedly secured adjacent the inboard side of the seat cushion; and a buckle interconnecting said inboard shoulder belt webbing and said inboard lap belt webbing for lockably receiving said clasp and said buckle anchor, said buckle including an outboard connect mechanism for releasably locking said clasp to said buckle to define a four point seat belt restraint configuration when said buckle and said clasp are positioned generally midway between the inboard and outboard side of the seat cushion and an inboard connect mechanism for automatically releasably locking said buckle to said buckle anchor to define a three point seat belt restraint configuration when said outboard shoulder belt webbing is extended diagonally from the top portion of the seat back adjacent the outboard side to the bottom portion of the seat back adjacent the inboard side and said clasp is releasably locked to said buckle by said outboard connect mechanism.

9. A vehicle seat comprising:

a seat back extending between a top portion and a bottom portion;

a seat cushion extending between an inboard side and an outboard side;

a first shoulder belt webbing extending from the top portion to the bottom portion of said seat back adjacent the inboard side of said seat cushion;

a second shoulder belt webbing extending from the top portion to the bottom portion of said seat back adjacent the outboard side of said seat cushion;

a first lap belt webbing extending from the inboard side of the seat cushion to said first shoulder belt webbing adjacent the bottom portion of said seat back;

a second lap belt webbing extending from the outboard side of the seat cushion to said second shoulder belt webbing adjacent the bottom portion of said seat back;

a clasp interconnecting one of said first and second shoulder belt webbing to a respective one of said first and second lap belt webbing;

a buckle interconnecting the other of said first and second shoulder belt webbing to a respective one of said first and second lap belt webbing for lockably receiving said clasp;

a buckle anchor fixedly secured adjacent one of the inboard and outboard side of said seat cushion for lockably receiving said buckle;

a first connect mechanism secured to said buckle for releasably locking said clasp to said buckle to define a four point seat belt restraint configuration with said buckle and clasp positioned generally midway between the inboard and outboard side of said seat cushion; and a second connect mechanism secured to said buckle for releasably locking said buckle to said buckle anchor to define a three point seat belt restraint configuration with said clasp releasably locked to said buckle and said buckle releasably locked to said buckle anchor adjacent one of the inboard and outboard side of said seat cushion.

* * * * *